United States Patent [19]

Gonzalez

[11] Patent Number: 4,765,293

[45] Date of Patent: Aug. 23, 1988

[54] HYBRID INTERNAL COMBUSTION RECIPROCATING ENGINE

[75] Inventor: Cesar Gonzalez, Wichita, Kans.

[73] Assignee: The Cessna Aircraft Company, Wichita, Kans.

[21] Appl. No.: 860,506

[22] Filed: May 7, 1986

[51] Int. Cl.$^4$ ............................................. F02B 17/00
[52] U.S. Cl. ............................... 123/275; 123/DIG. 7; 123/259; 123/262
[58] Field of Search ......... 123/275, 262, 279, DIG. 7, 123/259

[56] References Cited

U.S. PATENT DOCUMENTS

| | | | |
|---|---|---|---|
| 2,191,042 | 2/1940 | Ricardo | 123/259 |
| 2,902,011 | 9/1959 | Hoffmann | 123/279 |
| 4,126,106 | 11/1978 | Witzky | 123/DIG. 7 |
| 4,166,436 | 9/1979 | Yamakawa | 123/262 |
| 4,414,980 | 11/1983 | Loyd | 123/275 |

Primary Examiner—Raymond A. Nelli
Attorney, Agent, or Firm—Edward L. Brown, Jr.

[57] ABSTRACT

A low compression reciprocating internal combustion piston engine with a prechamber in the head connected to a main combustion chamber in the piston, the prechamber having an igniter, a pilot fuel injector and connecting lineal passage; the main chamber including a fuel injector for mixing the prechamber gases with the gases being compressed in the cylinder. The engine is a hybrid having transitional combustion modes from spark-ignited stratified charge mode at low power, to a spark-assisted compression ignition at higher power loads, and a strictly compression ignition mode at maximum power loads.

13 Claims, 4 Drawing Sheets

HYBRID INTERNAL COMBUSTION RECIPROCATING ENGINE

BACKGROUND OF THE INVENTION

The invention relates to reciprocating internal combustion engines fueled by turbine fuels, and more particularly of the type that operates on a combined stratified, spark-assisted compression ignition and torch-assisted compression ignition processes utilized with aviation turbine fuels.

Competition in the world for fossil fuels among various transportation segments will continue to grow and those fuels that are manufactured in relatively low quantities are becoming more expensive and vulnerable to critical shortages and environmental demands. Among aviation fuels, gasolines have proven to be the most vulnerable and the additional environmental constraints such as total elimination of lead as an anti-detonant additive are further threatening the future availability of high octane aviation gas. Automotive gasolines may provide a practical alternative to the low performance range of piston aircraft engines. However, high performance and high altitude piston aircraft engines must continue to depend upon high octane aviation gasolines, or an alternative fuel. There are large worldwide supplies of turbine fuels due to airline and military requirements which will be maintained in the foreseeable future. Such fuels offer plentiful supplies with existing distribution systems and are devoid of liability burdens associated with automotive gasolines used in aircraft.

Stratified charge engines have been in existence for over 50 years, as exemplified by the Ricardo Pat. No. 2,191,042. These engines in isolated cases have successfuly operated with turbine fuels, however, they have been used in ground transportation applications. Both stratified and diesel turbine fuel adaptations of the past represent low specific output engines with limited regard for economic considerations and their principal objectives being to meet particular emission standards and multi-fuel capabilities. All of the prior developments in these areas have failed to produce a light and efficient high specific output engine capable of operating on turbine fuels.

A number of prior art patents use a pilot fuel spray which is ignited by an electrical spark or surface heated element to establish a flame or stream of hot gases which in turn is used to ignite a main fuel charge such as typified by Hoffman, U.S. Pat. No. 2,902,011 and Loyd, U.S. Pat. No. 4,414,940.

The concept of shaping the piston crown to promote swirl as the piston approaches top dead center is generally taught in the patent to Yamakawa, U.S. Pat. No. 4,166,436, and applicant's recently granted U.S. Pat. No. 4,594,976.

SUMMARY OF THE INVENTION

The present invention is directed to a hybrid or convertible internal combustion engine process which utilizes a stratified charge Otto cycle during starting, idle and low specific output operations, while gradually converting to a spark or glow plug assisted or a non-assisted compression ignition (diesel) mode as specific engine outputs increase. Transitions from one mode of operation to another, and degree of said transitions depend on fuels adopted, combustion chamber compression ratios, degree of super or turbocharging, coolant temperatures, engine specific outputs, inlet air temperatures, relative prechamber/main chamber combustion volumes, prechamber discharge orifice proportions and other variables. By control of said variables the present invention combustion process may be adapted to a wide range of applications.

The precombustion chamber located in the cylinder head includes a pilot fuel injector and a source of ignition. The prechamber is connected to the main combustion chamber by means of a passage or orifice located in such a manner as to induce a swirling airflow within the prechamber during the compression stroke. During that swirling airflow, and prior to the piston reaching the top dead center, the pilot fuel injector discharges fuel into the precombustion chamber, the mixed fuel and air are then ignited by the ignition source which initiates the combustion process.

During the starting, idle or low specific power output operations the prechamber combustion process remains largely or completely dependent on the stratified charge principles described above. However, as power increases, with higher chamber surface temperatures, and higher fuel inputs, the ignition source dependencies change and the process approaches a spark or glow plug assisted or a non-assisted compression ignition (diesel) mode.

As combustion develops in the prechamber, temperatures and pressures increase, and the internal swirl flow is reversed as combustion gases leave the prechamber through the connecting passage and flow into the main chamber. The burning gases flowing through the connecting passage thus impart or enhance the swirling flow of air within said recess or bowl. As the piston approaches its top dead center position, the clearances between the piston top and cylinder head diminish thus forcing the squish air to flow towards the piston recess along the surface of the piston.

The hot gases, unburned fuel and/or torch flames emanating from the prechamber further increase the temperature and pressures within the piston recess and upon main fuel injector discharge of fuel, said prechamber efflux promotes mixing of fuel with the swirling air, accelerates precombustion chemical activities and eventually ignites or assists in the ignition of the main chamber swirling mixtures. Here again, at low specific power outputs, ignition of main chamber mixtures are dependent on prechamber efflux gases and/or torch flame. However, as specific outputs increase, said dependency decreases and the process gradually approaches a non-assisted compression ignition mode of operation.

Location of main combustion chamber piston recess substantially under the exhaust valve reduces heat losses from the main combustion volume, and complements confinement of main chamber gases within heated or insulated boundaries as indicated by combustion and precombustion enhancement provisions. Insulating inserts or liners with or without catalytic properties over prechamber, main chamber and associated ramps may be adopted depending on application, to enhance precombustion chemical reactions, reduce combustion delay periods, control formation of deposits, reduce heat losses to engine coolants and lubricating oils, avoid boundary quenching and reduce ablation or gas erosion due to excessive heating of light alloy elements.

Pilot and main fuel injections timings may be concurrent or staged depending again on application parameters such as maximum specific outputs, engine speeds, fuels used and justifiable complexity of associated fuel injection systems.

Processes noted above allow the adoption of a relatively low compression ratio engine capable of producing high specific power outputs using turbine fuels or other fuels devoid of strict octane and cetane specific ratings, ideally suited for aircraft use and capable at operation of relatively high fuel/air ratios (when compared with standard stratified or compression ignition engines), thus reducing engine size, weight, installation volume, manufacturing cost and reducing induction air supercharging or turbocharging demands.

Adoption of spark or glow plug ignition assistance provisions, hot insulated combustion chamber liners and prechamber torch ignition of main combustion chamber reduces combustion delay periods thus limiting the amounts of raw fuel present at point of ignition, and in turn yielding conservative combustion pressure rise rates and peak pressures. These conditions control knock and reduce engine structural demands.

It is therefore the principal object of the present invention to provide an aircraft reciprocating piston engine capable of operating on turbine fuels.

Another object of the invention is to provide a reciprocating piston engine other than aircraft applications capable of operating with fuels devoid of octane ratings or cetane specific rating requirements.

Another object of the present invention is to provide a lightweight high specific output piston engine capable of operating with turbine fuels at relatively low compression ratios and relatively high fuel/air ratios.

A further object of the present invention is to provide an improved piston engine capable of operation on spark-ignited stratified combustion at low specific output over a wide range of fuel/air ratios and transitioning to a spark-assisted compression ignition or non-assisted compression ignition mode at higher specific outputs but capable of efficient operation at fuel/air ratios higher than normally practical with traditional non-assisted compression ignition engines.

Another object of the present invention is to provide an improved piston engine with low specific air consumption and throttleless operation thereby extending the altitude capabilities of current technology turbochargers.

Further objects and features of the invention will become apparent from the following detailed description taken in connection with the accompanying drawings which form a part of this specification.

DESCRIPTION OF THE PREFERRED EMBODIMENT

Figure 1:
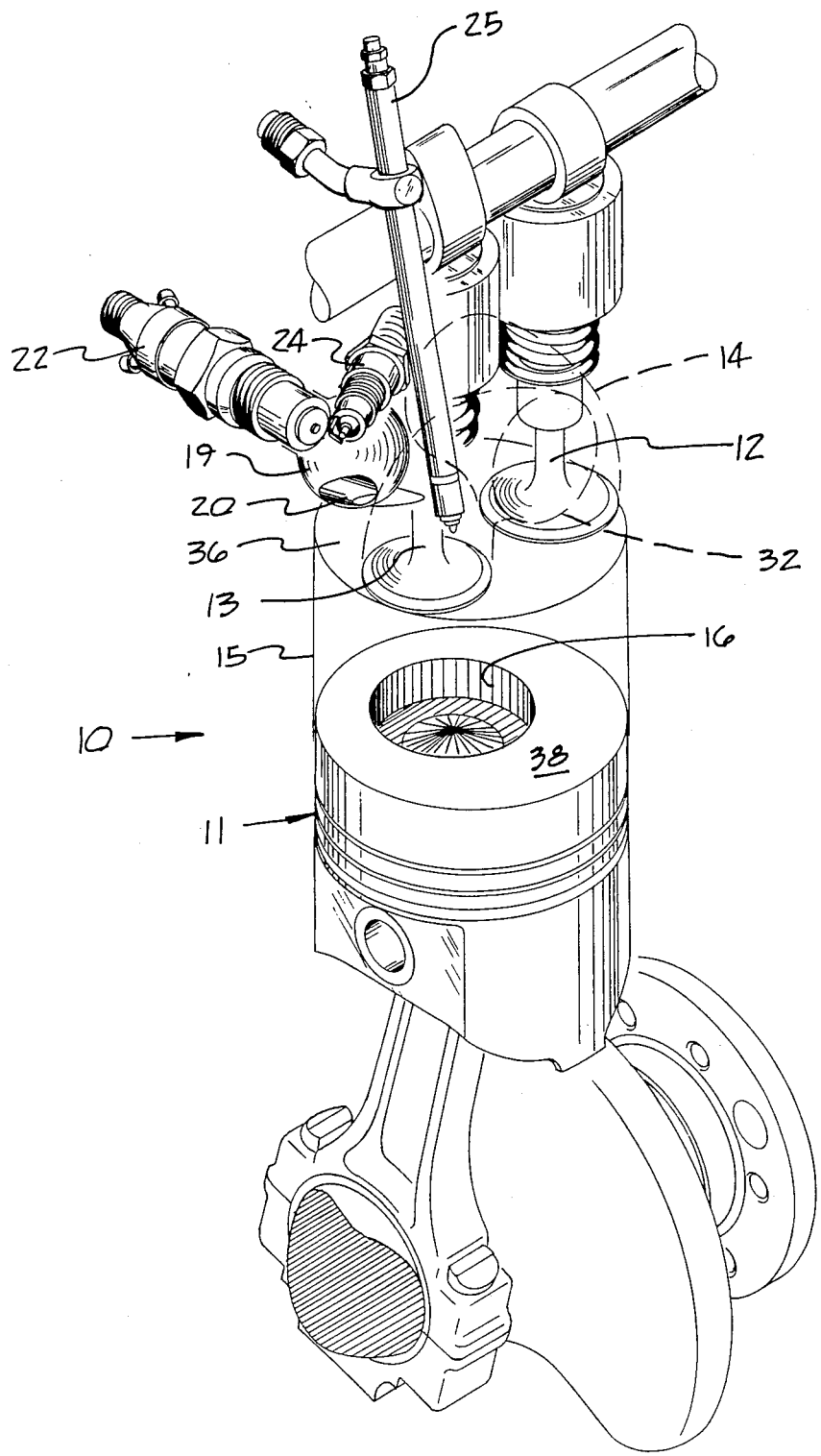
FIG. 1 is a perspective view of the engine of the present invention with the cylinder and head not shown in detail, to better view the combustion chambers.

The hybrid engine of the present invention is generally described by reference numeral 10, as seen in FIG. 1. While the engine is only shown with a single cylinder 15, it is capable of utilizing any number of cylinders in any cylinder arrangement pattern. Various parts of the engine are conventional and well-known in the art and are therefore not described in detail.

Figure 2:
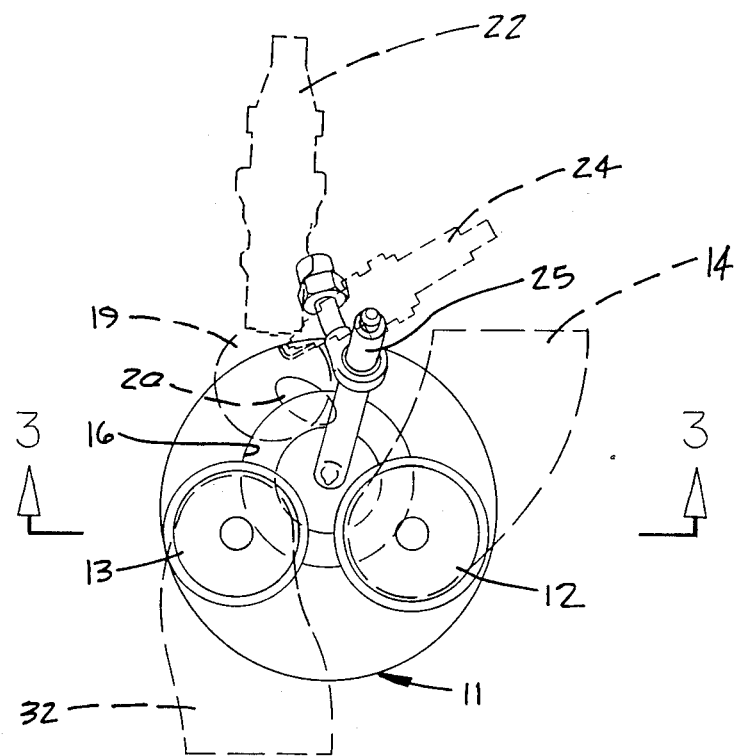
FIG. 2 is a top plan view of the piston with the precombustion chamber and its related components shown in dotted line.
Figure 3:
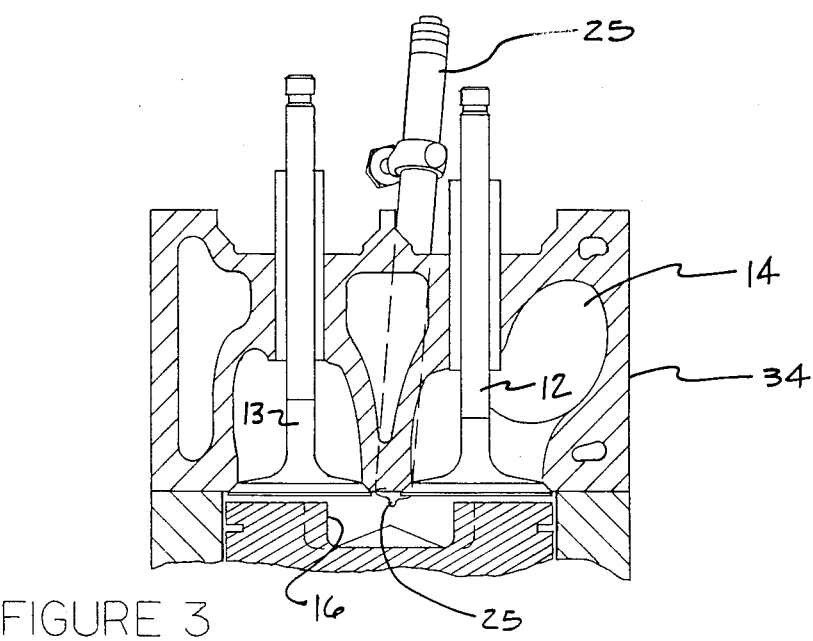
FIG. 3 is a sectional view taken along line 3—3 of FIG. 2, illustrating the cylinder, cylinder head and piston in the top dead center position.
Figure 4:
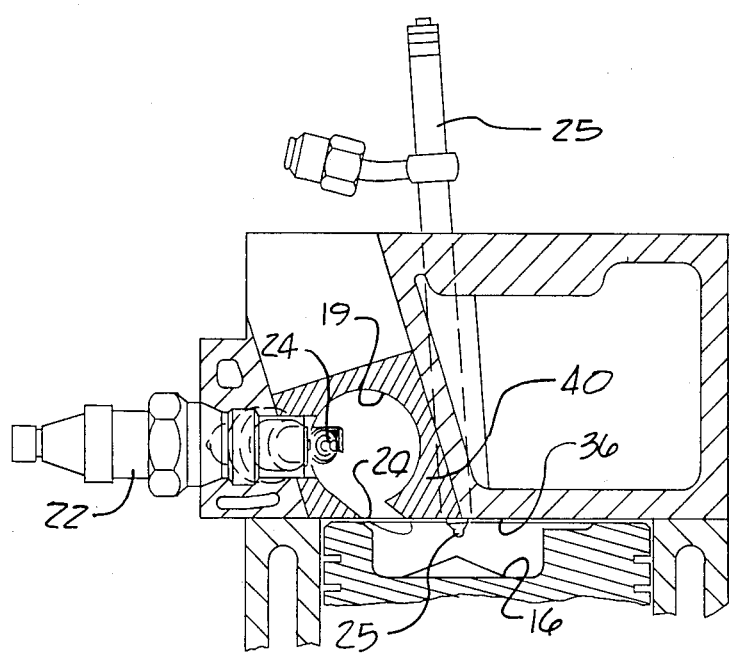
FIG. 4 is a sectional view taken along lines 4—4 of FIG. 5.
Figure 5:
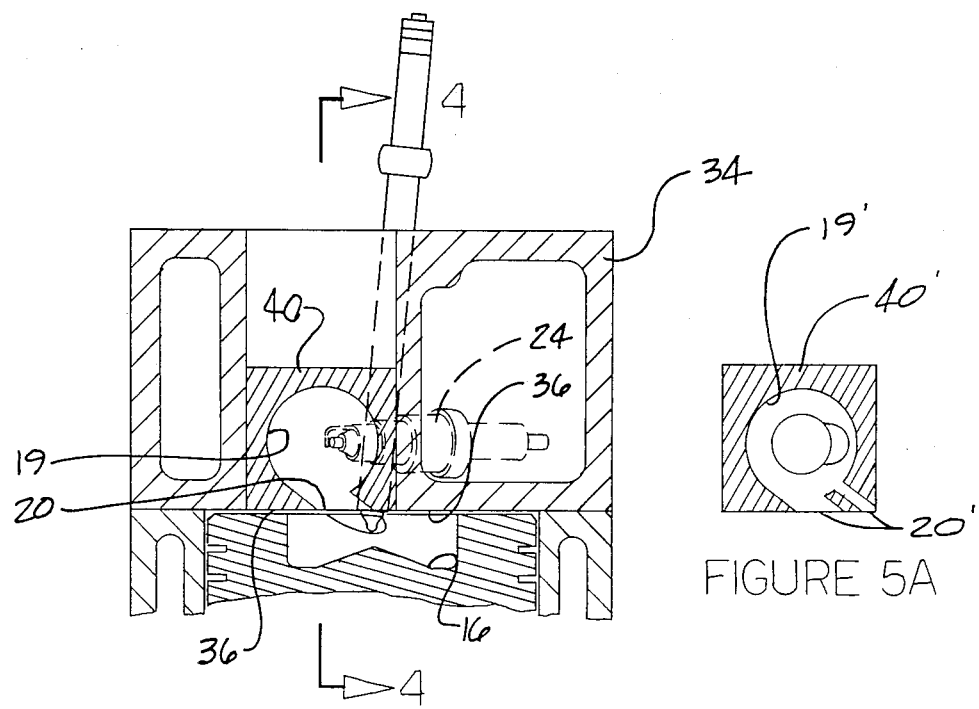
FIG. 5 is a sectional view through the precombustion chamber and cylinder.

The engine includes a piston 11, reciprocally mounted within a cylinder 15, closed at its upper end by a cylinder head 34, as best seen in FIGS. 3, 4 and 5. Located in the cylinder head 34 are a pair of conventional inlet and exhaust valves 12 and 13, respectively, located in inlet and exhaust passages 14 and 32 (shown in dotted line in FIG. 1). Passing through the inner surface 36 of cylinder head 34 is a main fuel injector 25, as best seen in FIGS. 2, 3 and 4. Also located in cylinder head 34 is a precombustion chamber or prechamber 19 which connects with the interior of the cylinder through a lineal passage 20, as best seen in FIGS. 2 and 4. The cross sectional area of passage 20 must be sufficiently small to create a high enough velocity in chamber 19 during the compression stroke to maintain a high rate of fuel emulsification, yet not too strong to blow off the fire kernel. Also located in precombustion chamber 19 is a spark plug 24 and pilot fuel injector 22. Both the pilot injector 22 and the main injector 25 are controlled by conventional means not shown in the drawings. Chamber 19 is substantially spherical, or a figure of revolution, with lineal passage 20 tangentially intersecting chamber 19 so that gases entering through passage 20 create a swirling flow.

Located in the top surface 38 of the piston is main combustion chamber recess or bowl 16 which may be slightly offset from the center of the piston. Lateral passage 20 is tangentially aligned with recess 16 when the piston 11 is close to its top dead center position, as illustrated in FIGS. 2, 4, 5 and 7.

Figure 1A:
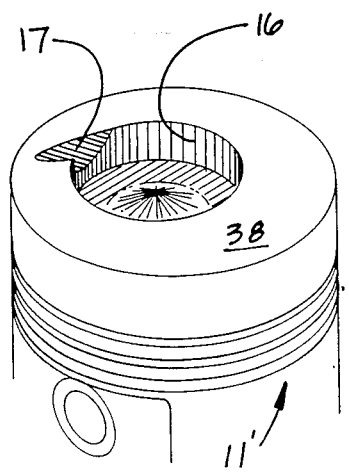
FIG. 1A is a perspective view of the piston only showing a modified form of the main combustion chambers.

FIG. 1A illustrates a slightly modified piston 11 with a tangential ramp 17 entering recess 16' which is longitudinally aligned with lineal passage 20 when piston 11' is in its top dead center position.

At the top dead center position, also referred to as TDC, the clearance between the top surface of the piston 38 and the inner surface 36 of the head is reduced to practical mechanical limits so that substantially all of the available combustion volume at TDC is basically precombustion chamber 19, lateral passage 20, main combustion chamber or recess 16 and ramp 17 when applicable.

FIGS. 4 and 5 illustrate a slightly modified form of the invention wherein the precombustion chamber 19 is provided with a liner 40. The liner is temperature-insulated material intended to raise the surface temperature for the purpose of promoting combustion. Various types of liner materials can be used which not only affect the chemical process of combustion, but also accelerate combustion, reduce combustion delays, accelerate evaporation of the fuel impinging on the liner surfaces, as well as control combustion deposits. The liner material may be an alloy incorporating elements such as nickel-chromium and copper. The liner material can also be a ceramic compound with elements such as zirconium which promote combustion via catalytic enhancement.

Figure 4A:
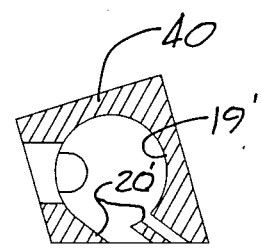
FIG. 4A is a similar sectional view of a modified form of precombustion chamber.
Figure 5A:
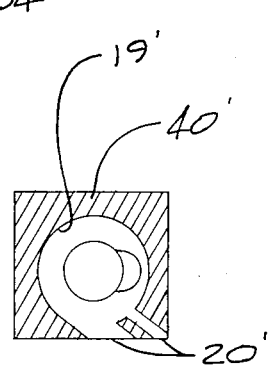
FIG. 5A is a similar sectional view of a modified form of precombustion chamber.

FIGS. 4A and 5A illustrate a modified form of precombustion chamber 19' which has multiple lineal passages 20' connecting to the main combustion chamber which provides a different flame discharge pattern.

DESCRIPTION OF THE OPERATION

The engine 10 operates in accordance with a four-stroke cycle. On the first stroke, piston 11 moves downward with intake valve 12 open and exhaust valve 13 closed. The downward movement of piston 11 cases air to flow through the normally unthrottled or unrestricted intake passage 14 into the cylinder 15. Airflow into the cylinder is promoted by atmospheric pressure or conventional supercharging pressures acting on the induction air entering passage 14. On the second stroke of the cycle, air inlet valve 12 is closed, exhaust valve 13 remains closed, and piston 11 moves upward to compress the air in cylinder 15, as illustrated by the COMPRESSION STROKE in FIG. 6. As the piston 11 moves upward during the compression stroke, compression air is forced through lineal passage 20 into precombustion chamber 19, introducing a swirling airflow pattern as indicated by the arrows in FIG. 6.

Figure 6:
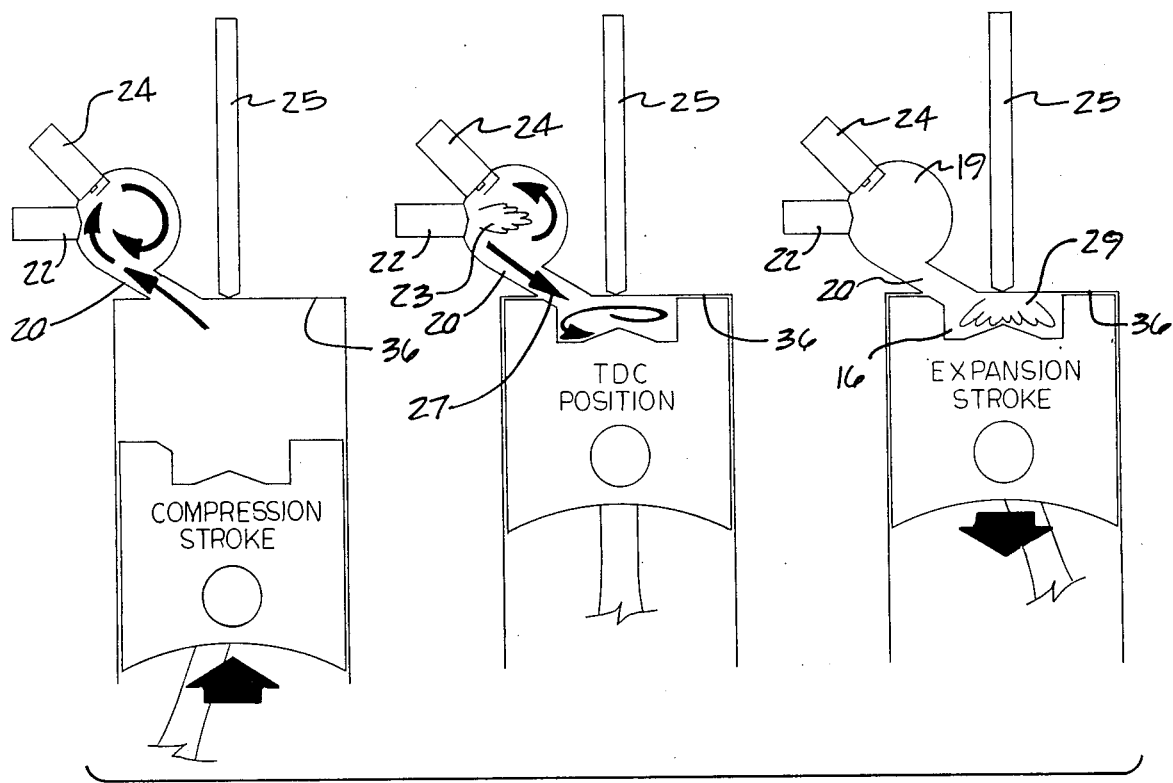
FIG. 6 is a symbolic illustration of various air, fuel and gas flows during compression, at top dead center and at the initiation of th expansion stroke.

As piston 11 approaches its top dead center position, pilot fuel injector 22 injects a spray 23 into the swirling compressed gases, as illustrated in the TDC position of FIG. 6. The optimum timing at which pilot fuel injection occurs would vary for each application, depending upon the operating conditions and the particular engine size. The amount of fuel injected during each individual cycle may be constant or may vary depending upon different applications. Occurring at substantially the same time as pilot injection, igniter spark plug 24 is caused to fire thereby beginning ignition. Other ignition sources such as electrically heated glow plugs, not shown, could also be utilized during engine start-up and initial warm-up, while the glow plug would remain heated by combustion heat with or without the assistance from an electrical source. As the pilot fuel spray begins to burn, the expansion of the burning gases causes a reversal in flow direction, as indicated by arrows 27 in FIG. 6. The burning gases or torch flame 27 are now directed tangentially into main combustion recess 16 causing a swirling action of the gases, as indicated by arrows 28 in FIG. 7.

As the piston 11 approaches its top dead center position, the clearance between the top surface 38 of the piston and the inner surface 36 of the head rapidly diminishes in an area generally referred to as the "squish volume". The gases in this rapidly decreasing volume will flow into main combustion chamber 16. This last-mentioned flow likewise induces a swirling flow and mixing action within recess 16. The squish volume gases entering recess 16 are caused to intersect and mix with the burning gases 27 flowing from the prechamber 19 while they together flow into the main combustion recess 16.

A main fuel spray 29 is injected into the main combustion recess 16 through main fuel injector 25. The timing of main fuel injection may be concurrent with the pilot fuel injection on engines of low specific output or low compression. However, generally, main fuel injection will be timed after pilot injection, well after prechamber combustion is under way. Delayed main fuel injection allows the fuel to burn with minimum delay within the strong swirling preconditioned air in piston recess 16, practically as it emerges from injector 25. Since no fuel is allowed to accumulate within recess 16, the combustion process that follows is smooth and conducive to low peak combustion gas pressures.

Under certain conditions of low power or with a cold engine, pilot and main fuel injection sprays may contact the surfaces of the prechamber 19 and recess 16, thus introducing a combustion delay factor, and during these circumstances, burning of deposited fuels will largely depend on fuel evaporation rates from those surfaces. Both pilot and main injectors 22 and 25 inject sprays directly into combustion volumes 19 and 16, and thus provide a wide range of fuel/air ratios.

Figure 7:
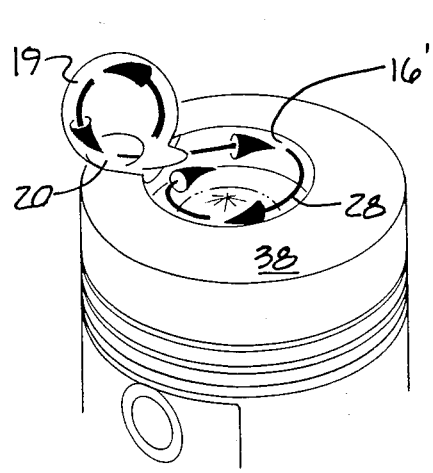
FIG. 7 is a perspective view of the FIG. 1A piston top surface illustrating the various air and gas flow paths at the top dead center position.

The modified piston 11' of FIG. 1A directs the burning gases 27 down an entry ramp 17 for a similar tangential entry into main chamber 16', as seen in FIG. 7.

From the foregoing statements, summary and descriptions in accordance with the present invention, it is understood that the same are not limited thereto, but are susceptible to various changes and modifications as known to those skilled in the art, and we therefore do not wish to be limited to the details shown and described herein, but intend to cover all such changes and modifications which would be encompassed by the scope of the appended claims.

I claim:

1. A hybrid type reciprocating internal combustion turbine fuel engine with combined spark ignition, torch-assisted to compression ignition modes comprising:
   a cylinder;
   a cylinder head mounted on the cylinder having a substantially planar inner surface;
   exhaust and inlet valves positioned in the head connected to corresponding exhaust and unthrottled inlet passages;
   a piston reciprocally mounted within the cylinder having a top surface thereon which surface in the top dead center position of the piston is in close proximity with the inner surface of of the cylinder head;
   a substantially spherical precombustion chamber located in the head;
   a lineal passage tangentially joining the precombustion chamber with the inner surface of the cylinder head;
   a pilot fuel injector means and an igniter means both located in the precombustion chamber which inject and ignite a precharge;
   a main fuel injector means in the cylinder head;
   a bowl-shaped recess comprising the main combustion chamber located in the top surface of the piston in close proximity with the main injector means in the top dead center position with said lineal passage tangentially aligned with the main combustion chamber, whereby the burning gases exiting the precombustion chamber are directed into the main combustion chamber causing ignition therein.

2. A hybrid type reciprocating internal combustion engine as set forth in claim 1, including:

a ramp means located in the top surface of the piston longitudinally aligned with said lineal passage when the piston is in the top dead center position.

3. A hybrid type reciprocating internal combustion engine as set forth in claim 1, wherein there is a timing delay between the pilot and main injector means.

4. A hybrid type reciprocating inernal combustion engine as set forth in claim 1 wherein the pilot injection precharge ignites by compression ignition in a medium to high power range.

5. A hybrid type reciprocating internal combustion engine as set forth in claim 1, wherein the precombustion chamber includes a temperature insulating liner means which raises the surface temperature to assist and accelerate combustion.

6. A hybrid type reciprocating internal combustion engine as set forth in claim 1, wherein the main combustion chamber includes a temperature insulating liner means which raises the surface temperature to assist and accelerate combustion.

7. A hybrid type reciprocating internal combustion engine as set forth in claim 1, wherein the compression ratio of the engine is in the range of 1:7 to 1:16 and the fuel utilized includes a range of diesel and turbine fuels.

8. A hybrid type reciprocating internal combustion engine as set forth in claim 1, wherein the exhaust valve is positioned in substantially overlapping relation with the main combustion recess.

9. A hybrid type reciprocating internal combustion engine as set forth in claim 1, wherein the compression ratio of the engine is in the range of 1:10 to 1:12 and the fuel utilized includes a range of diesel and turbine fuels.

10. A hybrid type reciprocating internal combustion engine as set forth in claim 1, wherein the pilot injector means provides a substantially constant flow rate per cycle at varying flow rates of the main injector means.

11. A hybrid type reciprocating internal combustion engine as set forth in claim 1, wherein the pilot injector means provides a variable flow rate per cycle at varying flow rates of the main injector means.

12. A hybrid type reciprocating internal combustion engine as set forth in claim 1, wherein there are multiple lineal passages between the precombustion and main combustion chambers, one of which tangentially joins the precombustion chamber.

13. A hybrid type reciprocating internal combustion engine as set forth in claim 1, wherein the compression ratio of the engine is in the range of 1:10, to 1:13 and the fuel utilized includes a range of diesel and turbine fuels.

* * * * *